April 29, 1924.
R. S. SWOPE
1,492,491
TRAILER STEERING APPARATUS
Filed May 24, 1921
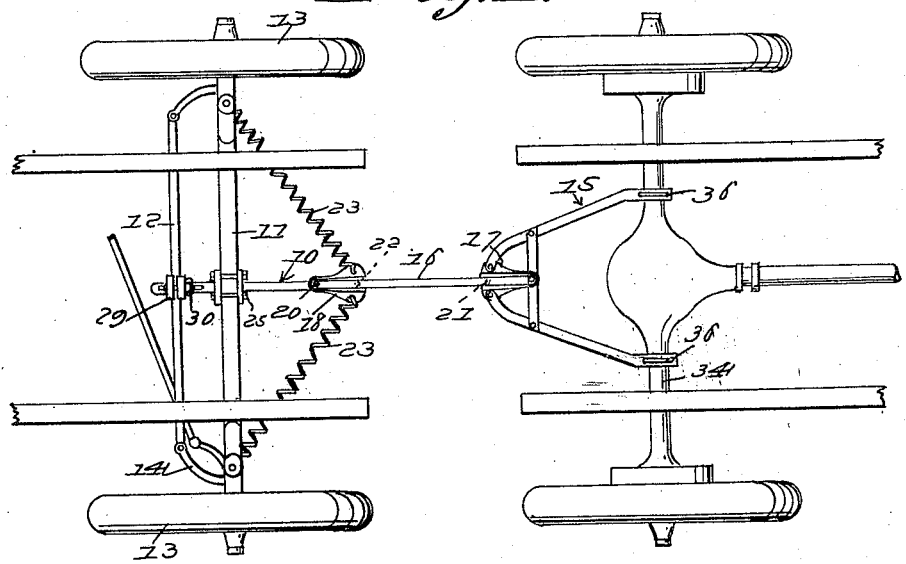
Fig. 1.
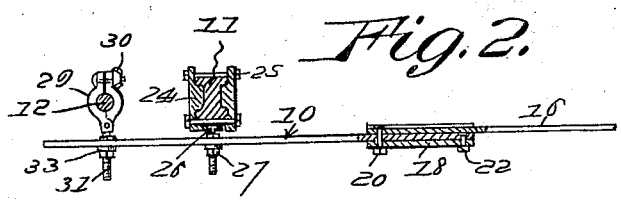
Fig. 2.
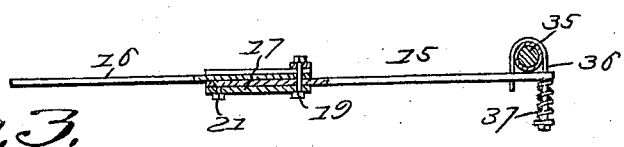
Fig. 3.
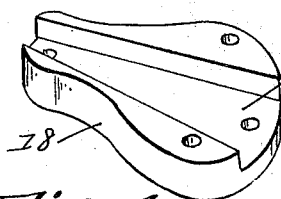
Fig. 4.
Fig. 5.
Inventor
Ralph S. Swope,
By G. Hume Talbert
Attorney Patented Apr. 29, 1924.

1,492,491

UNITED STATES PATENT OFFICE.

RALPH S. SWOPE, OF REDFIELD, SOUTH DAKOTA.

TRAILER STEERING APPARATUS.

Application filed May 24, 1921. Serial No. 472,243.

*To all whom it may concern:*

Be it known that RALPH S. SWOPE, a citizen of the United States of America, residing at Redfield, in the county of Spink and State of South Dakota, has invented new and useful Improvements in Trailer Steering Apparatus, of which the following is a specification.

The object of the invention is to provide a simple and efficient means whereby a trailer or a machine, for example of the automobile type, which is being towed by another machine may be accurately and efficiently steered or guided to insure tracking and obviate the necessity common in the present practice of having an operator in the trailer to guide the movements thereof; and with this object in view the invention consists in a construction and combination of parts of which a preferred embodiment is shown in the accompanying drawings, wherein:—

Figure 1 is a plan view of a trailer guiding mechanism embodying the invention showing the related rear and front parts respectively of a towing machine and a trailer.

Figure 2 is a detail view to show the mounting of the tongue forming an element of the apparatus upon the front axle of the trailer and the connection thereof to the steering bar and the reach also forming a part of the apparatus.

Figure 3 is a detail view of the means for connecting the reach with the rear axle of the towing car.

Figure 4 is a detail view in perspective of one of the harps.

Figure 5 is a similar view of the tongue.

The apparatus consists essentially of a tongue 10 provided with means for mounting the same upon the front axle 11 of a car to be towed or trailed and means for attachment to the steering bar 12 of the trailer, so as to communicate steering movement to the front wheels 13 through the usual knuckle arms 14, a yoke 15 atachable to the rear axle of the towing car, and a reach or towing bar 16 connecting the yoke with the tongue and serving to both draw the trailer and prevent the same from overrunning the towing car.

The connection between the extremities of the reach bar and the yoke and tongue is effected by means of harps 17 and 18, secured respectively as by bolts 19 and 20 respectively to said yoke and tongue and having respectively rearwardly and forwardly expanded or enlarged seats 21 and 22 for the reception of the ends of the reach bar which are pivoted to the harps at its extremities through respectively the foremost bolt 19 of the harp 17 and the rearmost bolt 20 of the harp 18, said seats permitting of a limited lateral swinging movement of the reach bar to relieve side strains while preventing such a freedom of movement of the parts as to permit the trailer to overrun the towing car. Contractile springs 23 are disposed in forwardly convergent relation extending from the extremities of the front axle of the trailer to the rear harp 18 to yieldingly center the tongue with relation to the trailer while permitting, as above indicated, a limited lateral movement of the reach bar independently of the harp 18 and hence of the tongue while permitting the reach bar to communicate angular swinging movement to the tongue when said reach bar comes in contact with either side wall of the seat 22, in opposition to the resistance offered by said springs 23 to the lateral swinging movement of the tongue.

In the construction illustrated the pivotal mounting of the tongue upon the front axle of the trailer embodies a clamp having the side plates 24 bolted together as at 25 and having a dependent swivelled bolt 26 to which the tongue is secured by nuts 27, said tongue being slotted as at 28 to receive the swivel bolt to permit of adjustment of the tongue relative to the axle and provide for placing the springs 23 under the desired tension to afford the desired resistance to the lateral swinging movement of the tongue.

Also in the construction illustrated the connection between the tongue, in rear of the axle and the steering bar 12 embodies a clamp 29 secured in place by a bolt and thumb nut 30 and having a pivot bolt 31 for extension through a slot 32 in the tongue where it is secured at the desired adjustment corresponding with the interval between the steering bar and the axle, by means of nuts 33.

The arms of the yoke 15 are secured to the rear axle 34 of the towing car by means of clips 35, each of which is provided with an extended arm 36 engaged by a cushion spring 37 to provide for an effective engagement with the axle while permitting sufficient lost motion to prevent straining the parts.

Having described the invention, what is claimed as new and useful is:—

A trailing attachment for motor driven vehicles having a tongue for pivotal mounting upon the front axle of the trailer and attachment to the steering bar thereof, a yoke for attachment to the rear axle of the towing car, and a reach bar pivotally connecting the front end of the tongue with said yoke for swinging movement in a horizontal plane, harps being carried respectively by said yoke and tongue and having seats in which the extremities of the reach bar are pivotally mounted, and said seats being transversely expanded or enlarged to provide for a limited independent swinging movement of the reach bar.

In testimony whereof he affixes his signature.

RALPH S. SWOPE.